(12) United States Patent
Kanazawa et al.

(10) Patent No.: US 7,057,327 B2
(45) Date of Patent: Jun. 6, 2006

(54) VEHICULAR ALTERNATOR

(75) Inventors: Hiroshi Kanazawa, Hitachiohta (JP);
Kenji Miyata, Hitachinaka (JP); Kaoru Kawabata, Hlitachi (JP); Kohji Maki, Hitachi (JP); Kazuo Tahara, Hitachi (JP); Susumu Sasaki, Ibaraki (JP); Ryoichi Takahata, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/941,655

(22) Filed: Aug. 30, 2001

(65) Prior Publication Data

US 2002/0117934 A1 Aug. 29, 2002

(30) Foreign Application Priority Data

Feb. 27, 2001 (JP) .............................. 2001-053017

(51) Int. Cl.
*H02K 1/22* (2006.01)
(52) U.S. Cl. ....................................... 310/263; 310/261
(58) Field of Classification Search ........... 310/156.66, 310/156.72, 156.73, 156.68, 283, 181, 261, 310/263, 40 R, 156.01, 156.38
See application file for complete search history.

(56) References Cited

U.S. PATENT DOCUMENTS

| 5,132,581 A | * | 7/1992 | Kusase ........................ 310/263 |
| 5,483,116 A | * | 1/1996 | Kusase et al. ............... 310/263 |
| 5,780,953 A | * | 7/1998 | Umeda et al. ............... 310/263 |
| 5,793,144 A | * | 8/1998 | Kusase et al. ............... 310/263 |
| 5,825,116 A | * | 10/1998 | Ishikawa ..................... 310/263 |
| 5,828,155 A | * | 10/1998 | Adachi et al. ............... 310/263 |
| 5,925,964 A | * | 7/1999 | Kusase et al. ............... 310/263 |
| 5,973,435 A | * | 10/1999 | Irie et al. ..................... 310/263 |
| 6,037,695 A | | 3/2000 | Kanazawa et al. |
| 6,104,118 A | * | 8/2000 | Kanazawa et al. .......... 310/263 |
| 6,144,138 A | | 11/2000 | Ragaly |
| 6,150,746 A | * | 11/2000 | Lechner ....................... 310/181 |
| 6,172,441 B1 | * | 1/2001 | York et al. ................... 310/263 |
| 6,225,727 B1 | * | 5/2001 | Oohashi et al. .............. 310/263 |
| 6,291,921 B1 | * | 9/2001 | Asao ........................... 310/263 |
| 6,333,582 B1 | * | 12/2001 | Asao et al. ................... 310/263 |
| 2001/0011856 A1 | * | 8/2001 | Asao et al. ................... 310/263 |
| 2002/0005673 A1 | * | 1/2002 | Umeda et al. ......... 310/156.11 |
| 2002/0011757 A1 | * | 1/2002 | Tanaka et al. ............... 310/263 |
| 2002/0021052 A1 | * | 2/2002 | Asao ........................... 310/263 |

FOREIGN PATENT DOCUMENTS

EP  0 762 617 A1  8/1996
EP  0 772 279 A1  10/1996

(Continued)

OTHER PUBLICATIONS

Merriam-Websters Collegiate Dictioanry, 10th edi., 1998, p. 1170.*

*Primary Examiner*—Darren Schuberg
*Assistant Examiner*—Heba Elkassabgi
(74) *Attorney, Agent, or Firm*—Crowell & Moring LLP (57) ABSTRACT

A vehicular alternator is provided which can effectively utilize the magnetic flux of a permanent magnet disposed between claw-type magnetic poles and can improve an output of the alternator. The vehicular alternator comprises a rotor and a stator constituted by coiling stator windings over a stator core, the rotor comprising a pair of claw-type magnetic poles arranged in an opposed relation, a permanent magnet disposed between adjacent two of a plurality of claws provided on the pair of claw-type magnetic poles, and field windings coiled radially inward of the plurality of claws. Each of the plurality of claws of the rotor is formed to have a shape coming into contact with the whole of a magnetic pole surface of the permanent magnet.

9 Claims, 8 Drawing Sheets

FOREIGN PATENT DOCUMENTS

| | | |
|---|---|---|
| EP | 0 891 152 A1 | 8/1999 |
| JP | 61-085045 | 3/1984 |
| JP | 08-098481 | 4/1996 |
| JP | 08-124740 | 5/1996 |
| JP | 09-322451 | 12/1997 |
| JP | 2890159 | 2/1999 |
| JP | 11036039 * | 2/1999 |
| JP | 11285214 * | 2/1999 |
| JP | 11285214 A * | 10/1999 |
| JP | 11-318064 | 11/1999 |
| JP | 110318064 * | 11/1999 |
| JP | 2000-134888 | 5/2000 |

* cited by examiner

VEHICULAR ALTERNATOR

BACKGROUND OF THE INVENTION

1. Field of the Invention

The present invention relates to a vehicular alternator, and more particularly to a vehicular alternator including a permanent magnet for auxiliary excitation.

2. Description of the Related Art

A vehicular alternator usually comprises a rotor and a stator. In general, the rotor comprises a pair of claw-type magnetic poles arranged in an opposed relation, and field windings coiled radially inward of a plurality of claws provided in each of the claw-type magnetic poles. When a current is supplied to the field windings, the pair of claw-type magnetic poles are magnetized to N and S poles. Also, the stator is constituted by coiling stator windings, from which an AC induced voltage is outputted, over a stator core. The rotor is rotated relative to the stator.

With such a structure, a magnetic circuit is formed in which the magnetic flux outgoing from the claw-type magnetic pole magnetized to an N pole returns to the claw-type magnetic pole magnetized to an S pole through the stator windings. The magnetic flux of the magnetic circuit is in an interlinkage relation to the stator windings of the stator, while the rotor rotates relative to the stator. As a result, an AC induced voltage is generated in the stator windings.

In the vehicular alternator having the above-described structure, efforts to reduce the magnetic flux leaked between the claw-type magnetic poles and to intensify the magnetic flux generated from the field windings for an increase in output of the alternator have been made, for example, by interposing a permanent magnet for auxiliary excitation between the claw-type magnetic poles. JP,A 11-318064, for example, discloses such a vehicular alternator including a permanent magnet for auxiliary excitation disposed between the claw-type magnetic poles.

The above-mentioned related are, however, has the following problem.

Usually, claws of a claw-type magnetic pole are each formed into a substantially triangular shape in section taken along the axial direction of a rotor such that the claw is tapered toward its tip, for the purpose of reducing the weight of a claw end portion. This is because the claws of the claw-type magnetic pole are cantilevered. In other words, such a sectional shape is intended to prevent the claw end portion from rising radially outward of the rotor due to centrifugal forces when the rotor rotates at high speeds. Therefore, when a permanent magnet having a relatively large thickness in the radial direction of the rotor is disposed between the adjacent claws of the claw-type magnetic poles, a part of each lateral surface (i.e., magnetic pole surface) of the permanent magnet in the circumferential direction of the rotor does not contact the claw, thus resulting in increased resistance against a flow of magnetic flux (i.e., greater magnetic loss) in a magnetic circuit formed by the permanent magnet. Accordingly, the magnetic flux of the permanent magnet is not effectively utilized.

In the above-described related art, each claw is likewise formed into a substantially triangular shape in section taken along the axial direction of the rotor such that the claw is tapered toward its tip. Although the related art employs a permanent magnet having a relatively small thickness in the radial direction of the rotor, a particular consideration is not focused on the shape of a contact surface between the claw and the permanent magnet. Hence, a part of a magnetic pole surface of the permanent magnet not contacting the claw also occurs near a claw end portion, and effective utilization of the magnetic flux of the permanent magnet is not ensured.

SUMMARY OF THE INVENTION

Accordingly, it is an object of the present invention to provide a vehicular alternator, which can effectively utilize the magnetic flux of a permanent magnet disposed between claw-type magnetic poles and can improve an output of the alternator.

(1) To achieve the above object, the present invention provides a vehicular alternator comprising a rotor and a stator constituted by coiling stator windings over a stator core, the rotor comprising a pair of claw-type magnetic poles arranged in an opposed relation, a permanent magnet disposed between adjacent two of a plurality of claws provided on the pair of claw-type magnetic poles, and field windings coiled radially inward of the plurality of claws, wherein each of the plurality of claws of the rotor is formed to have a shape coming into contact with the whole of the magnetic pole surface of the permanent magnet.

As described above in connection with the related art, claws of a claw-type magnetic pole are each usually formed into a substantially triangular shape in section taken along the axial direction of a rotor such that the claw is tapered toward its tip. Therefore, when a permanent magnet having a relatively large thickness in the radial direction of the rotor is disposed between the adjacent claws of the claw-type magnetic poles, a part of each lateral surface (magnetic pole surface) of the permanent magnet in the circumferential direction of the rotor does not contact the claw. Thus, the resistance against a flow of magnetic flux (i.e., magnetic loss) in a magnetic circuit formed by the permanent magnet is increased and the magnetic flux of the permanent magnet is not effectively utilized.

To overcome that problem, according to one aspect of the present invention, the claws of the claw-type magnetic poles are each formed to a shape coming into contact with the whole of the magnetic pole surface of the permanent magnet in the circumferential direction of the rotor. This feature enables almost all of the magnetic flux outgoing from the permanent magnet to flow into the claws, thus resulting in reduced resistance against a flow of the magnetic flux (i.e., smaller magnetic loss) in the magnetic circuit formed by the permanent magnet. As a result, the magnetic flux of the permanent magnet disposed between the adjacent claws of the claw-type magnetic poles can be effectively utilized, and the output of the vehicular alternator can be increased.

(2) In above (1), preferably, each of the plurality of claws has an auxiliary magnetic pole portion contacting the whole of the magnetic pole surface of the permanent magnet.

(3) In above (2), preferably, the auxiliary magnetic pole portion is formed to have a greater width on the outer side in the radial direction of the rotor than on the inner side in the radial direction of the rotor.

(4) In above (1), preferably, each of the plurality of claws is formed such that an inner surface of each claw in the radial direction of the rotor is substantially parallel to an outer surface thereof in the radial direction of the rotor.

(5) In above (4), preferably, the plurality of claws are interconnected by a substantially ring-shaped coupling member.

(6) In any of above (1) to (5), more preferably, each of the plurality of claws has a magnet holding portion for holding the permanent magnet.

(7) Also, to achieve the above object, the present invention provides a vehicular alternator comprising a rotor and a stator constituted by coiling stator windings over a stator core, the rotor comprising a pair of claw-type magnetic poles arranged in an opposed relation, a permanent magnet disposed between adjacent two of a plurality of claws provided on the pair of claw-type magnetic poles, and field windings coiled radially inward of the plurality of claws, wherein an auxiliary magnetic pole plate contacting the whole of a magnetic pole surface of the permanent magnet is interposed between each of the plurality of claws and the permanent magnet.

Thus, according to another aspect of the present invention, the auxiliary magnetic pole plate contacting the whole of a lateral surface (magnetic pole surface) of the permanent magnet in the circumferential direction of the rotor is interposed between each claw and the permanent magnet. This arrangement enables almost all of the magnetic flux outgoing from the permanent magnet to flow into the claws, thus resulting in reduced resistance against a flow of the magnetic flux (i.e., smaller magnetic loss) in the magnetic circuit formed by the permanent magnet. As a result, the magnetic flux of the permanent magnet disposed between the adjacent claws of the claw-type magnetic poles can be effectively utilized, and the output of the vehicular alternator can be increased.

(8) In above (7), preferably, the auxiliary magnetic pole plate has a magnet holding portion for holding the permanent magnet.

(9) In any of above (1) to (8), more preferably, a protective member is disposed at least on the outer side of the permanent magnet in the radial direction of the rotor.

DESCRIPTION OF THE PREFERRED EMBODIMENTS

Embodiments of the present invention will be described with reference to the drawings.

Figure 1:
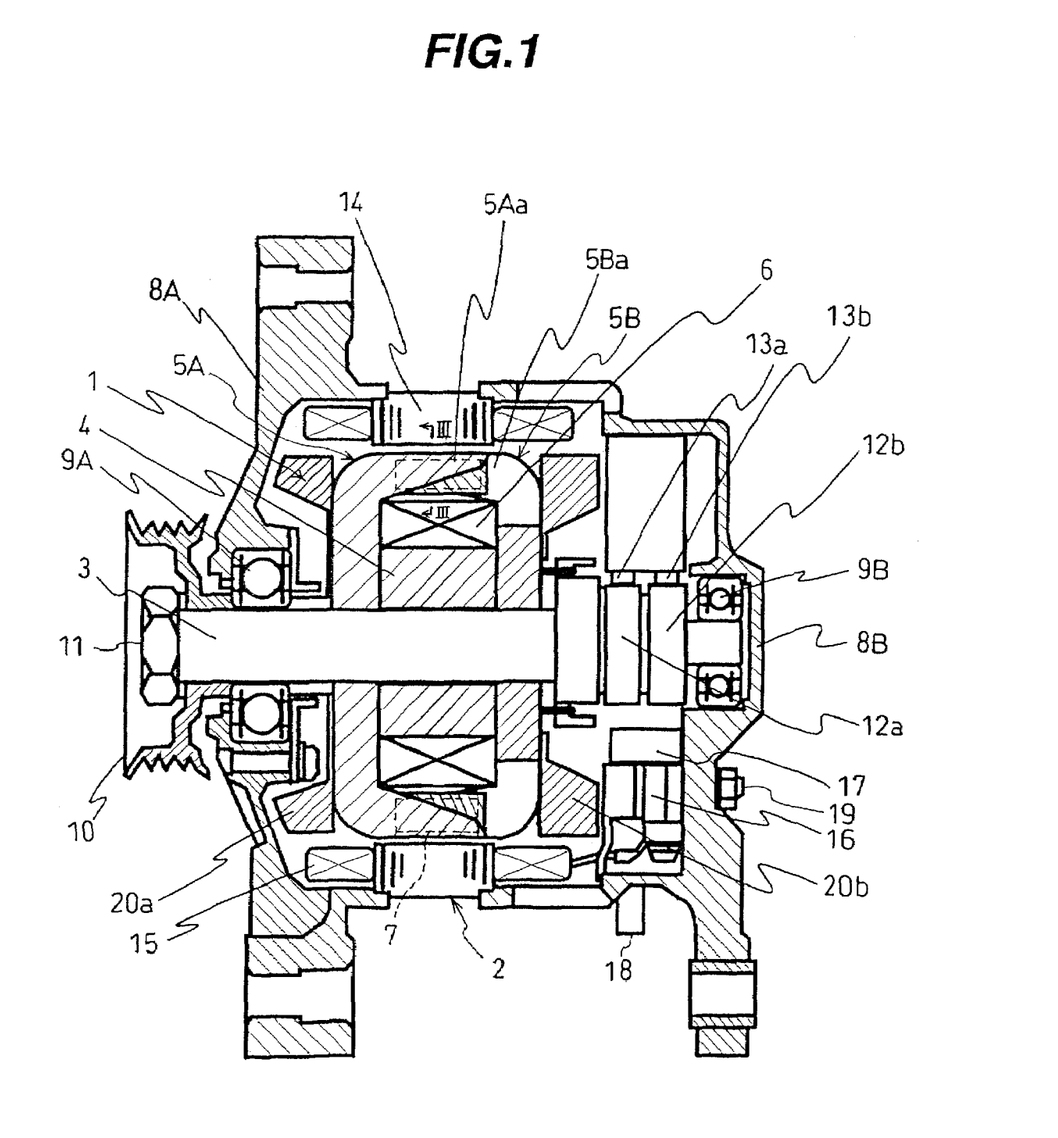
FIG. 1 is a sectional view showing an overall structure of a first embodiment of a vehicular alternator according to the present invention.

FIG. 1 is a sectional view showing an overall structure of a first embodiment of a vehicular alternator according to the present invention.

Referring to FIG. 1, the vehicular alternator of this embodiment mainly comprises a rotor 1 and a stator 2. The rotor 1 comprises a shaft (rotary shaft) 3; a yoke 4 having the center of rotation through which the shaft 3 is inserted; a pair of claw-type magnetic poles 5A, 5B each made of a magnetic substance and having the center of rotation through which the shaft 3 is inserted, the claw-type magnetic poles 5A, 5B being arranged in an opposed relation through the yoke 4 with a predetermined spacing held between them in the axial direction of the rotor 1 (left-and-right direction in FIG. 1); and field windings 6 coiled over the yoke 4.

The claw-type magnetic poles 5A, 5B are provided with a plurality of claws 5Aa, 5Ba, respectively. Looking in the circumferential direction of the rotor 1, as shown in FIG. 1, the claws 5Aa, 5Ba are disposed to project alternately in the axial direction of the rotor 1 (left-and-right direction in FIG. 1) in an overlapped relation. A permanent magnet 7 for auxiliary excitation is interposed between two adjacent claws 5Aa, 5Ba in the circumferential direction of the rotor 1. Further, the field windings 6 coiled over the yoke 4 are positioned inward of the claws 5Aa, 5Ba in the radial direction of the rotor 1 with a predetermined space gap left therebetween.

The shaft 3 is rotatably supported with respect to an alternator body, which comprises end brackets 8A, 8B, by a bearing 9A at a position near an end on one side (left side in FIG. 1) and a bearing 9B at a position near an end on the other side (right side in FIG. 1). Also, a pulley 10 is fixed by a bolt 11 to the end of the shaft 3 on one side (left side in FIG. 1), and slip rings 12a, 12b are provided near the end of the shaft 3 on the other side (right side in FIG. 1). Additionally, the pulley 10 is coupled by a belt or the like to, for example, a crank pulley of an engine (not shown).

Inside the end bracket 8B, brushes 13a, 13b are provided in slide contact with outer circumferences of the slip rings 12a, 12b. A current is supplied to the field windings 6 of the rotor 1 during rotation thereof through the brushes 13a, 13b and the slip rings 12a, 12b. By supplying a current to the field windings 6, the claw-type magnetic pole 5A of the rotor 1 is magnetized to an S pole and the claw-type magnetic pole 5B is magnetized to an N pole.

The stator 2 comprises a stator core 14 sandwiched between the end brackets 8A, 8B and positioned outward of the claws 5Aa, 5Ba in the radial direction of the rotor 1 (on the upper and lower sides in FIG. 1) with small gaps left relative to the claws 5Aa, 5Ba; and three-phase stator windings 15 coiled over the stator core 14 for outputting an AC induced voltage from them. The rotor 1 is rotated relative to the stator 2. With the stator 2 having the above-described structure, a magnetic circuit is formed in which the magnetic flux outgoing from the claw-type magnetic pole 5B magnetized to an N pole returns to the claw-type magnetic pole 5A magnetized to an S pole through the stator core 14. The magnetic flux of the magnetic circuit is in an interlinkage relation to the stator windings 15, while the rotor 1 rotates relative to the stator 2. As a result, an AC induced voltage is generated in the stator windings 15.

A rectifying circuit 16 and a voltage adjuster 17 are provided inside the end bracket 8B. The rectifying circuit 16 has a battery terminal 18 connected to a positive electrode of a battery (not shown) and a grounding terminal 19 connected to a negative electrode of the battery (not shown). The rectifying circuit 16 rectifies the AC induced voltage, which is generated in the stator windings 15 as described above, for conversion into a DC voltage. The voltage adjuster 17 controls the current supplied to the field windings 6 depending on a load current and the number of revolutions of the rotor 1 so that the DC voltage rectified by the rectifying circuit 16 is kept at a constant voltage of, e.g., about 14.5 V, for thereby charging the battery (not shown).

Cooling fans 20a, 20b for air-cooling the stator 2 and the rectifying circuit 16 are provided on both sides of the rotor 1 in the axial direction thereof (left-and-right direction in FIG. 1). The cooling fans 20a, 20b produces cooling air at a flow rate in proportion to the number of revolutions of the rotor 1.

In this embodiment thus constructed, the most important feature of the present invention resides in that the claws 5Aa, 5Ba of the rotor 1 are each formed to have a shape coming into contact with the whole of the lateral surface (i.e., magnetic pole surface) of the permanent magnet 7 in the circumferential direction of the rotor 1.

Figure 2:
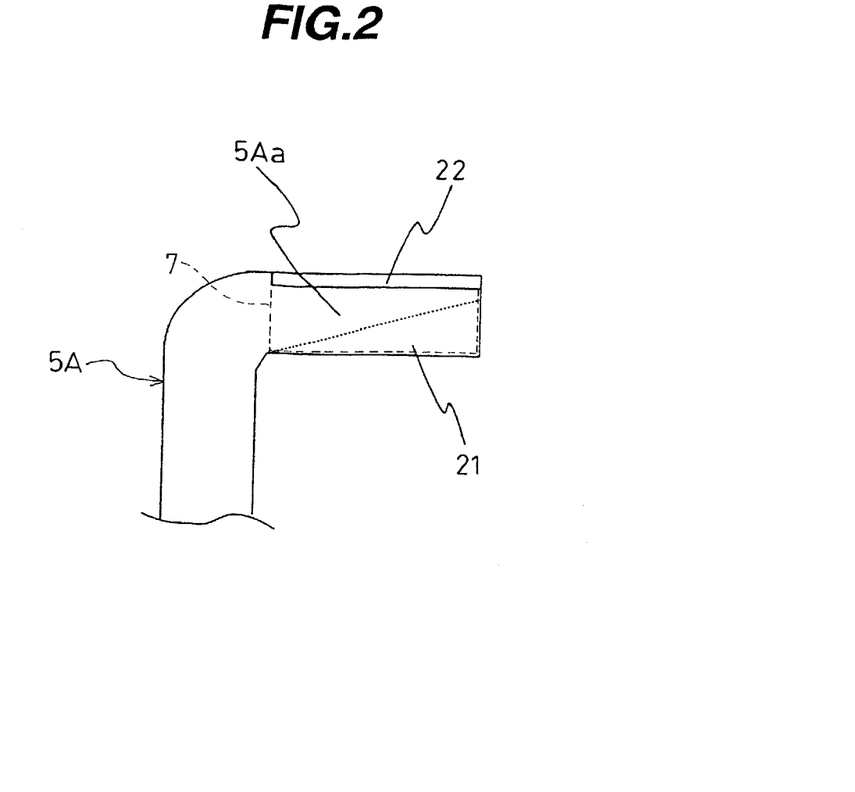
FIG. 2 is a side view showing a detailed structure of a claw provided in the first embodiment of the vehicular alternator according to the present invention.
Figure 3:
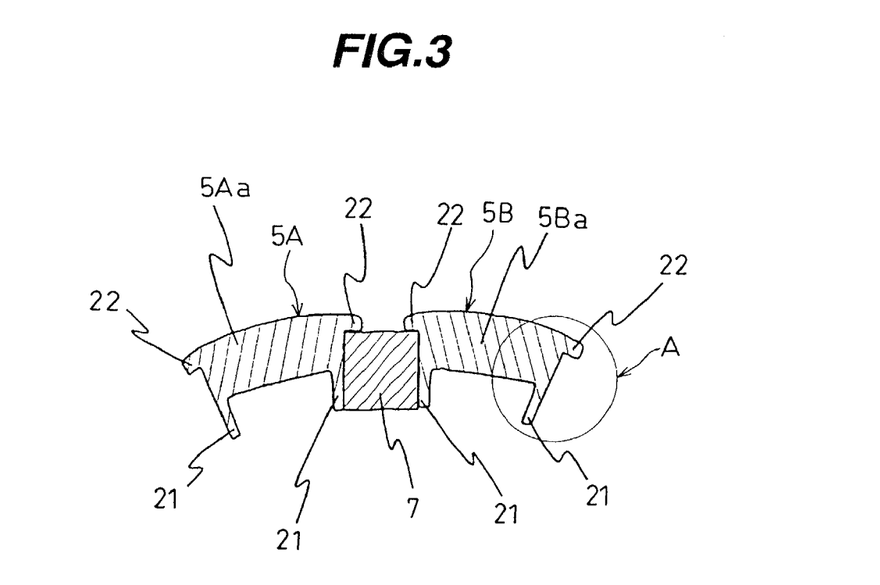
FIG. 3 is a sectional view, taken along line III—III in FIG. 1, showing the positional relationship between claws and a permanent magnet provided in the first embodiment of the vehicular alternator according to the present invention.

FIG. 2 is a side view showing a detailed structure of the claw 5Aa, and FIG. 3 is a sectional view, taken along line III—III in FIG. 1, showing the positional relationship between the claws 5Aa, 5Ba and the permanent magnet 7. For the sake of brevity, FIG. 3 shows only one pole constituted by each of the claws 5Aa, 5Ba.

More specifically, as shown in FIGS. 2 and 3, the claws 5Aa, 5Ba are each formed into a substantially triangular shape in section taken along the axial direction of the rotor 1 (left-and-right direction in FIG. 2), as indicated by dotted line in FIG. 2 similarly to the related art, such that the claw 5Aa, for example, is tapered toward its tip (to the right in FIG. 2), except for both lateral ends of each claw in the circumferential direction of the rotor 1. The permanent magnet 7 is formed to have substantially rectangular lateral surfaces (i.e., magnetic pole surfaces) in the circumferential direction of the rotor 1 (left-and-right direction in FIG. 3). Then, as described above, the permanent magnet 7 is interposed between the claws 5Aa, 5Ba overlapping with each other in the axial direction of the rotor 1 (left-and-right direction in FIG. 2).

In addition, auxiliary magnetic pole portions 21 are provided at both the lateral ends of each of the claws 5Aa, 5Ba (end surfaces of the claws 5Aa, 5Ba facing each other in an overlapped relation) in the circumferential direction of the rotor 1 (left-and-right direction in FIG. 3) so as to project inward for contact with the whole of the magnetic pole surfaces of the permanent magnet 7. In this embodiment, each auxiliary magnetic pole portion 21 is formed into substantially the same shape as the corresponding magnetic pole surface of the permanent magnet 7 so that the auxiliary magnetic pole portion 21 is brought into close contact with the permanent magnet 7. Further, projecting flanges 22 are provided at both the lateral ends of each of the claws 5Aa, 5Ba in the circumferential direction of the rotor 1 (left-and-right direction in FIG. 3) so as to project circumferentially from outermost portions of both the lateral ends of each claw in the radial direction of the rotor 1 (upper side in FIG. 3). The flanges 22 serve to prevent the permanent magnet 7 from ejecting outward due to the rotation of the rotor 1.

The operation of the thus-constructed vehicular alternator of this embodiment will be described below.

First, a current is supplied through the brushes 13a, 13b and the slip rings 12a, 12b to the field windings 6 of the rotor 1 that is rotated upon receiving motive power from, e.g., the engine (not shown). With the supply of a current, as described above, the claw-type magnetic pole 5A of the rotor 1 is magnetized to an S pole and the claw-type magnetic pole 5B is magnetized to an N pole. A magnetic circuit is thereby formed in which the magnetic flux outgoing from the claw-type magnetic pole 5B magnetized to an N pole returns to the claw-type magnetic pole 5A magnetized to an S pole through the stator core 14 in the stator 2. At that time, the magnetic flux of the magnetic circuit formed by the field windings 6 is intensified by addition of the magnetic flux of the permanent magnet 7 for auxiliary magnetization. Furthermore, the magnetic flux of the magnetic circuit is in an interlinkage relation to the stator windings 15. As a result, with the rotation of the rotor 1 an AC induced voltage is generated in the 3-phase stator windings 15 coiled over the stator core 14.

The generated voltage is rectified by the rectifying circuit 16 for conversion into a DC voltage, and then finally charged in the battery (not shown). For charging the battery (not shown) with the DC voltage rectified by the rectifying circuit 16, the voltage adjuster 17 controls the current supplied to the field windings 6 depending on a load current and the number of revolutions of the rotor 1 so that the generated voltage is kept at a constant voltage of, e.g., about 14.5 V.

Advantages obtainable with the operation of this embodiment will be described below.

(1) Higher Output

Usually, claws of a claw-type magnetic pole are each formed into a substantially triangular shape in section taken along the axial direction of a rotor such that the claw is tapered toward its tip. Therefore, when a permanent magnet having a relatively large thickness in the radial direction of the rotor is disposed between the adjacent claws of the claw-type magnetic poles, a part of each magnetic pole surface of the permanent magnet does not contact the claw. Thus, the resistance against a flow of magnetic flux (i.e., magnetic loss) in a magnetic circuit formed by the permanent magnet is increased and the magnetic flux of the permanent magnet is not effectively utilized.

To cope with that problem, in this embodiment, the claws 5Aa, 5Ba of the claw-type magnetic poles 5A, 5B are each formed to have a shape coming into contact with the whole of the magnetic pole surface of the permanent magnet 7 in the circumferential direction of the rotor 1, thereby enabling almost all of the magnetic flux outgoing from the permanent magnet 7 to flow into the claws 5Aa, 5Ba. It is hence possible to reduce the resistance against a flow of the magnetic flux (i.e., magnetic loss) in the magnetic circuit formed by the permanent magnet 7 and to effectively utilize the magnetic flux of the permanent magnet. As a result, the output of the vehicular alternator can be increased.

(2) Lower Cost

Also, in this embodiment, even in the case of reducing the size of the permanent magnet 7, the magnetic flux of the permanent magnet 7 can be effectively utilized and the output of the vehicular alternator can be increased because of the advantage of above (1). Consequently, the production cost of the vehicular alternator can be reduced.

(3) Restraint of Demagnetization at High-Temperatures

For example, a neodymium magnet is employed as the permanent magnet for auxiliary excitation. The inflection point of an irreversible demagnetization characteristic of such a permanent magnet varies when temperature rises. If the permeance factor is low, therefore, the magnetic density may reduce at high temperatures (called demagnetization at high temperatures). In such a case, when the conventional claw-type magnetic pole is employed which has the claw not contacting the whole of the magnetic pole surface of the permanent magnet, the resistance against a flow of the magnetic flux is increased in the part of the magnetic pole surface of the permanent magnet not contacting the claw of the claw-type magnetic pole, and hence the permeance factor is partly lowered.

Comparing a working point of a permanent magnet having both magnetic poles not in contact with a magnetic substance and a working point of a permanent magnet having both magnetic poles in contact with a magnetic substance, the latter permanent magnet having both magnetic poles in contact with a magnetic substance has a higher magnetic density at the working point because the permeance factor is higher at the working point thereof. In this embodiment, since both the magnetic poles of the permanent magnet 7 are entirely held in contact with the claws 5Aa, 5Ba (exactly speaking, the auxiliary magnetic pole portions 21) of the claw-type magnetic poles 5A, 5B, the effect of the demagnetization at high temperatures can be minimized and an allowance of the permanent magnet 7 for compensating the demagnetization at high temperatures can be increased.

(4) Easier Magnetization of Permanent Magnet

For the purpose of preventing metal dust, such as iron powder, from adhering to the permanent magnet, a process of manufacturing the vehicular alternator generally comprises the steps of arranging each permanent magnet for auxiliary excitation, which is in a not yet magnetized state, between the adjacent claws of the claw-type magnetic poles, adjusting a balance in rotation of a rotor, and magnetizing the permanent magnet through an external magnetizing yoke (not shown), for example, in a final stage of the process for manufacturing the rotor. When applying such a manufacturing process to the vehicular alternator of this embodiment, since both the lateral surfaces of the permanent magnet 7 in the circumferential direction of the rotor 1 are entirely held in contact with the claws 5Aa, 5Ba (exactly speaking, the auxiliary magnetic pole portions 21) of the claw-type magnetic poles 5A, 5B, magnetic flux can be sufficiently permeated to the permanent magnet 7 in the not yet magnetized state, and hence the operation of magnetizing the permanent magnet 7 can be facilitated.

Figure 4:
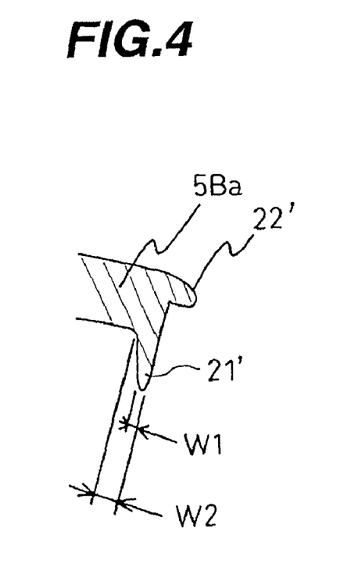
FIG. 4 is a partial enlarged view corresponding to a part A in FIG. 3, showing a structure of a modification in which an auxiliary magnetic pole portion provided in the vehicular alternator of the first embodiment according to the present invention is modified with intent to realize reinforcement of the strength, to promote a smooth flow of magnetic flux, and to reduce noise.

In this embodiment described above, as shown in FIG. 3, the auxiliary magnetic pole portion 21 provided on each of the claws 5Aa, 5Ba is formed to have a substantially uniform thickness (width in the left-and-right direction in FIG. 3). However, the auxiliary magnetic pole portion 21 may be modified as shown in FIG. 4. Specifically, an auxiliary magnetic pole portion 21' shown in FIG. 4 has a width W2 on the proximal side (on the upper side in FIG. 4, i.e., the outer side in the radial direction of the rotor 1) slightly thicker than a width W1 on the distal side (on the lower side in FIG. 4, i.e., the inner side in the radial direction of the rotor 1). The auxiliary magnetic pole portion 21' having such a shape contributes to increasing the mechanical strength of the auxiliary magnetic pole portion itself and smoothing a flow of the magnetic flux incoming from the permanent magnet 7.

Further, in the modification of FIG. 4, the flange 22 is replaced by a flange 22' that is beveled at its outermost corner. The beveled flange 22' makes smoother magnetic coupling and decoupling between the claws 5Aa, 5Ba and the stator core 14 during the rotation of the rotor 1. Accordingly, pulsations of the magnetic flux in the space gaps between the stator 2 and the claws 5Aa, 5Ba are reduced. It is hence possible to suppress magnetic vibration and reduce noise.

Note that FIG. 4 is a partial enlarged view showing a detailed structure of the modification corresponding to a part A in FIG. 3 of the first embodiment.

A second embodiment of the vehicular alternator of the present invention will be described below with reference to FIG. 5.

Figure 5:
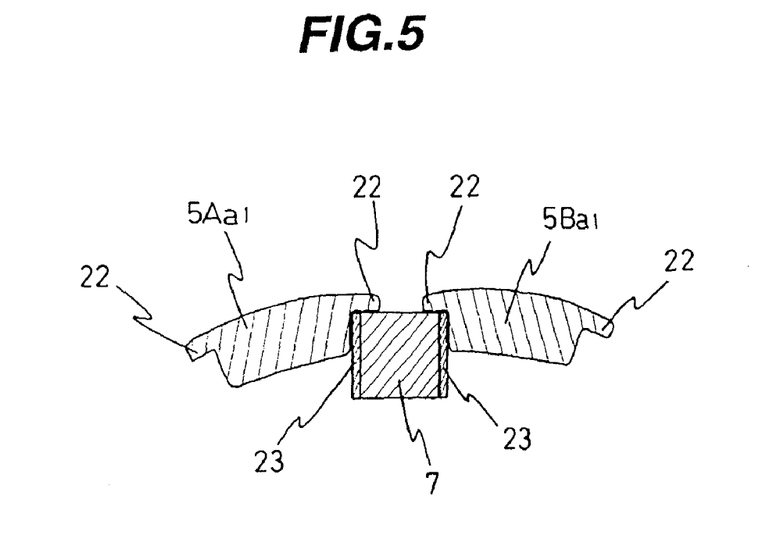
FIG. 5 is a sectional view corresponding to FIG. 3, showing the positional relationship between claws of claw-type magnetic poles and a permanent magnet provided in a second embodiment of the vehicular alternator according to of the present invention.

FIG. 5 is a sectional view corresponding to FIG. 3, showing the positional relationship between claws $5Aa_1$, $5Ba_1$ of the claw-type magnetic poles 5A, 5B and the permanent magnet 7 provided in the second embodiment of the vehicular alternator according to the present invention. In FIG. 5, similar components to those in FIG. 3 are denoted by the same reference characters and a description thereof is omitted herein. In the following description, other drawings are also referred to, as an occasion requires. For the sake of brevity, FIG. 5 shows only one pole constituted by each of the claws $5Aa_1$, $5Ba_1$, as with FIG. 3.

Though not specifically shown for the sake of brevity, the claws $5Aa_1$, $5Ba_1$ are each formed into a substantially triangular shape in section taken along the axial direction of the rotor 1 (direction perpendicular to the drawing sheet of FIG. 5) such that the claw is tapered toward its tip, similarly to the related art, except for the flanges 22. In this embodiment, as shown in FIG. 5, an auxiliary magnetic pole plate 23 made of a magnetic substance is interposed between each of the claws $5Aa_1$, $5Ba_1$ having the shape described above and the permanent magnet 7 such that the plate 23 contacts the whole of a corresponding magnetic pole surface of the permanent magnet 7. The remaining construction is the same as that of the first embodiment.

Thus, in this embodiment, since the auxiliary magnetic pole plate 23 contacting the whole of the magnetic pole surface of the permanent magnet 7 is interposed between each of the claws $5Aa_1$, $5Ba_1$ and the permanent magnet 7, almost all of the magnetic flux outgoing from the permanent magnet 7 is rendered to flow into the claw-type magnetic poles 5A, 5B through the auxiliary magnetic pole plates 23. It is hence possible to reduce the resistance against a flow of the magnetic flux (i.e., magnetic loss) in the magnetic circuit formed by the permanent magnet 7. As with the first embodiment, therefore, the magnetic flux of the permanent magnet 7 disposed between the adjacent claws $5Aa_1$, $5Ba_1$ of the claw-type magnetic poles 5A, 5B can be effectively utilized, and the output of the vehicular alternator can be increased.

When magnetizing the permanent magnet 7 in this embodiment, the auxiliary magnetic pole plates 23 are previously bonded to the surfaces (both left and right side surfaces in FIG. 5) of the permanent magnet 7, which are to be magnetized. The permanent magnet 7 including the auxiliary magnetic pole plates 23 is disposed between two adjacent claws $5Aa_1$, $5Ba_1$, and then magnetized through an external magnetizing yoke (not shown). As described above, the permanent magnet 7 is preferably magnetized in a final stage of the process for manufacturing the rotor 1 after attaching the cooling fans 20a, 20b (see FIG. 1) and adjusting a balance in rotation of the rotor. By employing such a magnetizing process, it is possible to prevent metal dust, such as iron powder, from adhering to the permanent magnet, and to realize a vehicular alternator with high reliability.

A third embodiment of the vehicular alternator of the present invention will be described below with reference to FIG. 6.

Figure 6:
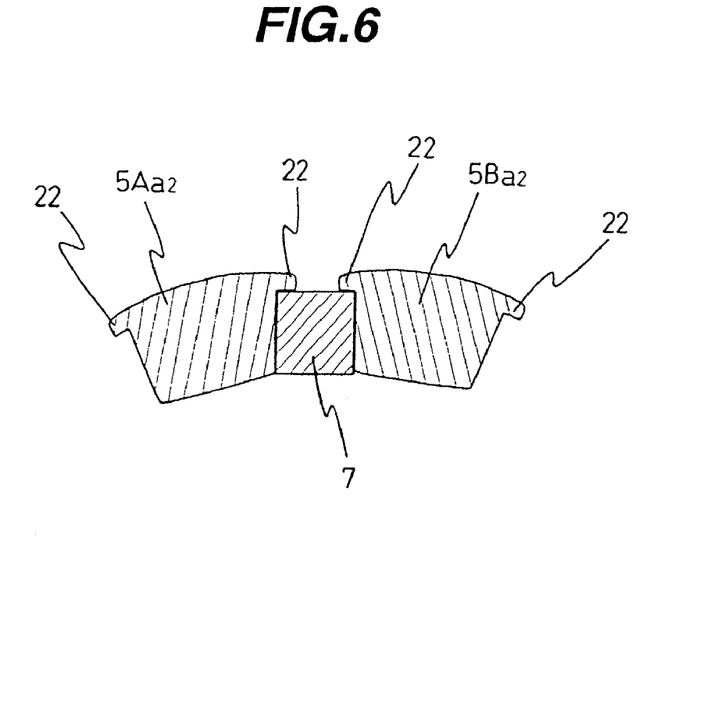
FIG. 6 is a sectional view corresponding to FIG. 3, showing the positional relationship between claws of claw-type magnetic poles and a permanent magnet provided in a third embodiment of the vehicular alternator according to the present invention.

FIG. 6 is a sectional view corresponding to FIG. 3, showing the positional relationship between claws $5Aa_2$, $5Ba_2$ of the claw-type magnetic poles 5A, 5B and the permanent magnet 7 provided in the third embodiment of the vehicular alternator according to the present invention. In FIG. 6, similar components to those in FIG. 3 are denoted by the same reference characters and a description thereof is omitted herein. In the following description, other drawings are also referred to, as an occasion requires. For the sake of brevity, FIG. 6 shows only one pole constituted by each of the claws $5Aa_2$, $5Ba_2$ as with FIG. 3.

In this embodiment, the claws $5Aa_2$, $5Ba_2$ are each formed such that an inner surface (lower side in FIG. 6) of each claw in the radial direction of the rotor 1 is substantially parallel to an outer surface (upper side in FIG. 6) thereof in the radial direction of the rotor 1. In other words, though not specifically shown for the sake of brevity, each of the claws $5Aa_2$, $5Ba_2$ is formed to have a thickness substantially uniform throughout from the distal end to the proximal end, and hence to have a substantially rectangular shape in section taken along the axial direction of the rotor 1 (direction perpendicular to the drawing sheet of FIG. 6).

Because of the claws $5Aa_2$, $5Ba_2$ having such a structure, both the lateral surfaces (magnetic pole surfaces) of the permanent magnet 7 in the circumferential direction (left-and-right direction in FIG. 6) of the rotor 1 are entirely held in close contact with the claws $5Aa_1$, $5Ba_1$ made of a magnetic substance. The remaining construction is the same as that of the first embodiment. Accordingly, this embodiment can also provide similar advantages to those in the first embodiment.

Moreover, this embodiment is particularly suitable for a vehicular alternator used in, e.g., construction machines or the likes. Since the claws $5Aa_2$, $5Ba_2$ are each formed to have a thickness substantially uniform throughout from the distal end to the proximal end, the distal end of each claw $5Aa_2$, $5Ba_2$ has greater weight than those of the claws 5Aa, 5Ba, $5Aa_1$ and $5Ba_1$ used in the first and second embodiments. Hence, there is a possibility in this embodiment that the claw distal end may rise outward (upward in FIG. 6) due to the rotation of the rotor 1 (see FIG. 1). In general, however, a vehicular alternator used in, e.g., construction machines or the likes rotates at constant speed with the relatively small number of revolutions in the range of 3000 to 4000 rpm. Therefore, the stresses acting upon root portions of the claws $5Aa_2$, $5Ba_2$ attributable to centrifugal forces are relatively small, thus resulting in a small possibility that the distal ends of the claws $5Aa_2$, $5Ba_2$ rise as mentioned above. On the other hand, the claws $5Aa_2$, $5Ba_2$ each having the above-described shape in this embodiment enable the magnetic flux smoothly to flow into each claw from the permanent magnet 7. This embodiment is hence suitable for the vehicular alternator used in, e.g., construction machines or the likes, which is required to have a higher output.

Figure 7:
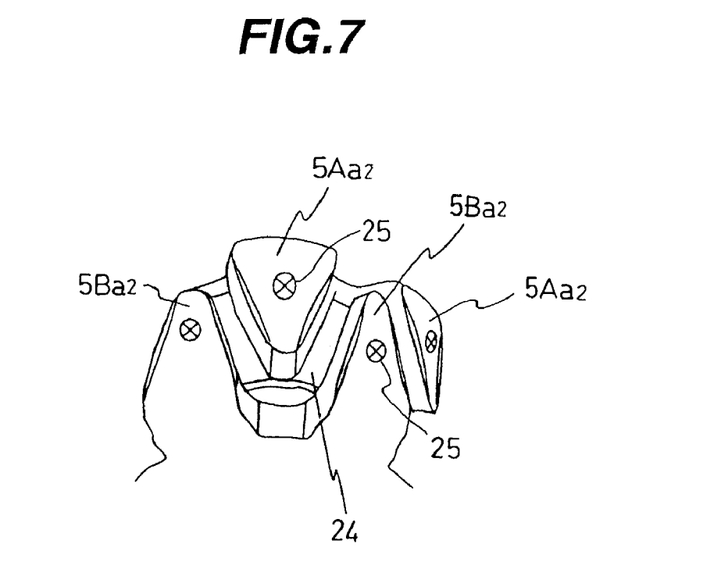
FIG. 7 is a perspective view showing a detailed structure of a modification of the third embodiment of the vehicular alternator according to the present invention, in which the claws are interconnected by a coupling ring.

Furthermore, in the case of rotating the vehicular alternator of this third embodiment at high speeds, the claws $5Aa_2$, $5Ba_2$ may be interconnected by a coupling ring 24, which is substantially in the form of a ring and fitted to the claws from the inner side in the radial direction of the rotor 1. The coupling ring 24 is fixed to each of the claws $5Aa_2$, $5Ba_2$ by a screw 25 (the fixing method is not limited to the use of screws, and the coupling ring 24 may be fixed by welding, for example). In such a modification, it is desired that the coupling ring 24 is made of a nonmagnetic substance and the screw 25 is made of a magnetic substance. For the sake of brevity, the permanent magnet 7 is omitted from FIG. 7. Additionally, the coupling ring 24 constitutes a substantially ring-shaped coupling member set forth in claim 5.

A magnet cover may be disposed as a protective member at least on the outer side of the permanent magnet 7 in the radial direction of the rotor 1. The magnetic cover serves to prevent fragments of the permanent magnet 7 from ejecting outward of the rotor 1 due to the rotation of the rotor 1 in the event the permanent magnet 7 is broken for some reason.

Several modifications, in which a magnetic cover is provided in the vehicular alternator of the present invention, will be described below one by one.

Figure 8:
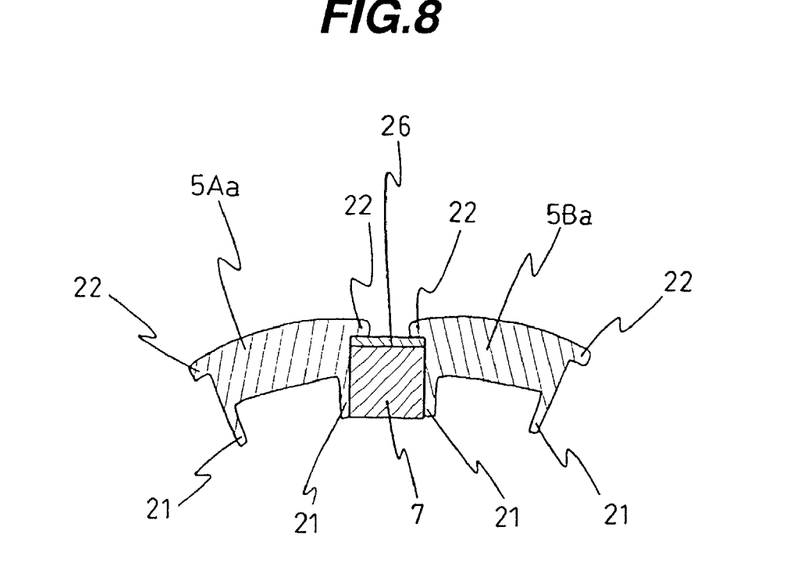
FIG. 8 is a sectional view corresponding to FIG. 3, showing the positional relationship between claws of claw-type magnetic poles and a permanent magnet provided in a modification of the first embodiment of the vehicular alternator according to the present invention, in which a magnet cover is provided.

FIG. 8 is a sectional view corresponding to FIG. 3, showing the positional relationship between the claws 5Aa, 5Ba of the claw-type magnetic poles 5A, 5B and the permanent magnet 7 provided in a modification of the above-described first embodiment of the vehicular alternator according to the present invention, in which a magnet cover is provided. In FIG. 8, similar components to those in FIG. 3 are denoted by the same reference characters and a description thereof is omitted herein. In the following description, other drawings are also referred to, as an occasion requires. For the sake of brevity, FIG. 8 shows only one pole constituted by each of the claws 5Aa, 5Ba as with FIG. 3.

Referring to FIG. 8, an outer surface of the permanent magnet 7 in the radial direction of the rotor 1 closely contacts a magnetic cover 26 having substantially the same rectangular shape as the outer surface of the permanent magnet 7. The magnetic cover 26 is preferably made of a nonmagnetic substance having superior rust resistance, such as stainless steel, so that the magnetic flux of the permanent magnet 7 disposed between the adjacent claws 5Aa, 5Ba of the claw-type magnetic poles 5A, 5B acts effectively. In this modification, the magnetic cover 26 is retained in place by the flanges 22. While the magnetic cover 26 is provided in this modification, both the magnetic pole surfaces of the permanent magnet 7 are entirely held in contact with the claws 5Aa, 5Ba (exactly speaking, the auxiliary magnetic pole portions 21) of the claw-type magnetic poles 5A, 5B.

Figure 9:
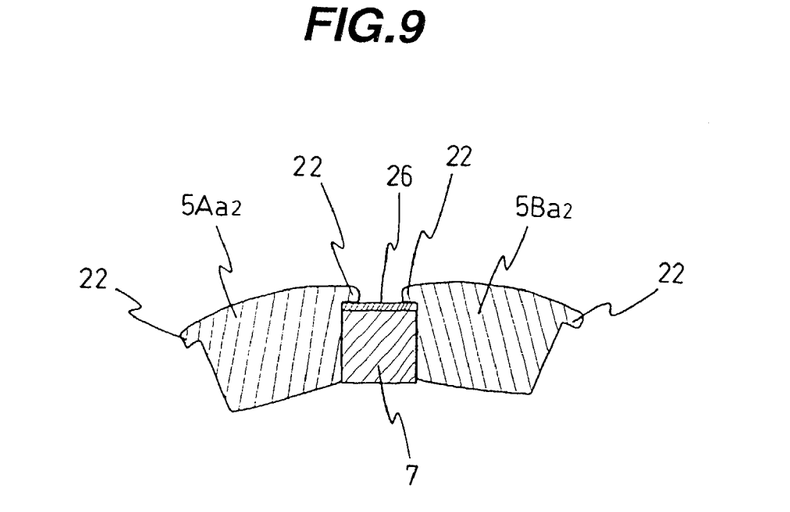
FIG. 9 is a sectional view corresponding to FIG. 6, showing the positional relationship between claws of claw-type magnetic poles and a permanent magnet provided in a modification of the third embodiment of the vehicular alternator according to the present invention, in which a magnet cover is provided.

FIG. 9 is a sectional view corresponding to FIG. 6, showing the positional relationship between the claws $5Aa_2$, $5Ba_2$ of the claw-type magnetic poles 5A, 5B and the permanent magnet 7 provided in a modification of the above-described third embodiment of the vehicular alternator according to the present invention, in which a magnet cover is provided. In FIG. 9, similar components to those in FIG. 6 are denoted by the same reference characters and a description thereof is omitted herein. In the following description, other drawings are also referred to, as an occasion requires. For the sake of brevity, FIG. 9 shows only one pole constituted by each of the claws $5Aa_2$, $5Ba_2$ as with FIG. 6.

Referring to FIG. 9, as with the modification described above with reference to FIG. 8, an outer surface of the permanent magnet 7 in the radial direction of the rotor 1 closely contacts a magnetic cover 26 having substantially the same rectangular shape as the outer surface of the permanent magnet 7. Preferably, the magnetic cover 26 is made of a nonmagnetic substance having superior rust resistance, e.g., stainless steel, so that the magnetic flux of the permanent magnet 7 disposed between the adjacent claws $5Aa_2$, $5Ba_2$ of the claw-type magnetic poles 5A, 5B acts effectively. In this modification, the magnetic cover 26 is likewise retained in place by the flanges 22. While the magnetic cover 26 is provided in this modification, both the magnetic pole surfaces of the permanent magnet 7 are entirely held in contact with the claw-type magnetic poles 5A, 5B (exactly speaking, the claws $5Aa_2$, $5Ba_2$).

This modification is also adaptable for the case of rotating the rotor 1 at high speeds by interconnecting the claws $5Aa_2$, $5Ba_2$ by the coupling ring 24 described above with reference to FIG. 7.

With the above two modifications, in addition to the similar advantages to those in the first embodiment, another advantage can be obtained in preventing fragments of the broken permanent magnet 7 from ejecting outward of the rotor 1 due to the rotation of the rotor 1 in the event the permanent magnet 7 is broken for some reason.

When magnetizing the permanent magnet 7 in the above two modifications, the magnetic cover 26 is bonded to the outer surface of the permanent magnet 7 in the radial direction of the rotor 1 beforehand. The permanent magnet 7 including the magnetic cover 26 is disposed between the adjacent claws of the claw-type magnetic poles 5A, 5B, and then magnetized through an external magnetizing yoke (not shown). As described above, the permanent magnet 7 is preferably magnetized in a final stage of the process for manufacturing the rotor 1. By employing such a magnetizing process, it is possible to prevent metal dust, such as iron powder, from adhering to the permanent magnet, and to realize a vehicular alternator with high reliability.

While each of the above two modifications has a structure that the outer surface of the permanent magnet 7 in the radial direction of the rotor 1 is protected by the magnetic cover 26 in the form of a plate, the present invention is not limited to such a structure. Because surfaces of the permanent magnet 7 other than the magnetic pole surfaces thereof impose no effects upon the magnetic characteristics, the magnetic cover may have, for example, a shape surrounding surfaces of the permanent magnet 7 other than the magnetic pole surfaces thereof. In other words, the magnetic cover may have various shapes within the scope not departing from the technical concept of the magnetic cover. A description is now made of modifications of the vehicular alternator according to the present invention, in which a magnetic cover is provided to surround four surfaces of the permanent magnet 7 other than the magnetic pole surfaces thereof, with reference to FIGS. 10 and 11.

Figure 10:
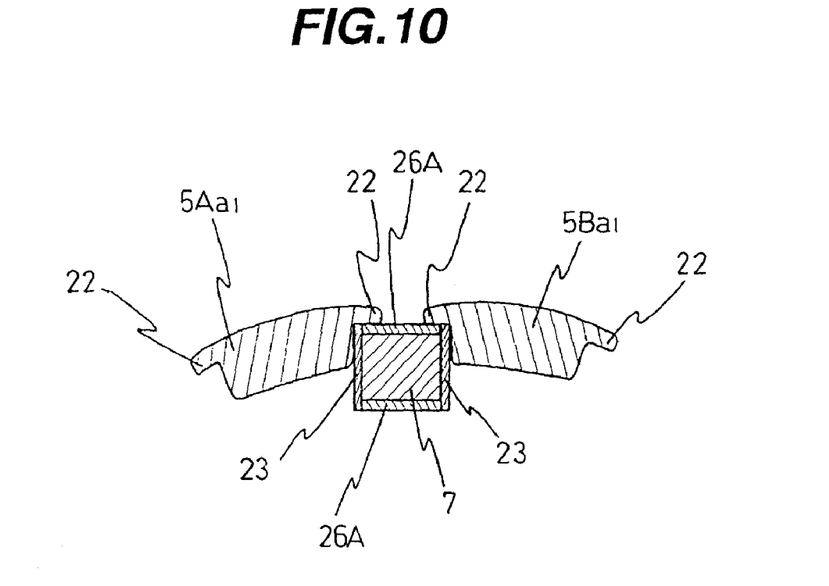
FIG. 10 is a sectional view corresponding to FIG. 5, showing the positional relationship between claws of claw-type magnetic poles and a permanent magnet provided in a modification of the second embodiment of the vehicular alternator according to the present invention, in which a magnet cover is provided.
Figure 11:
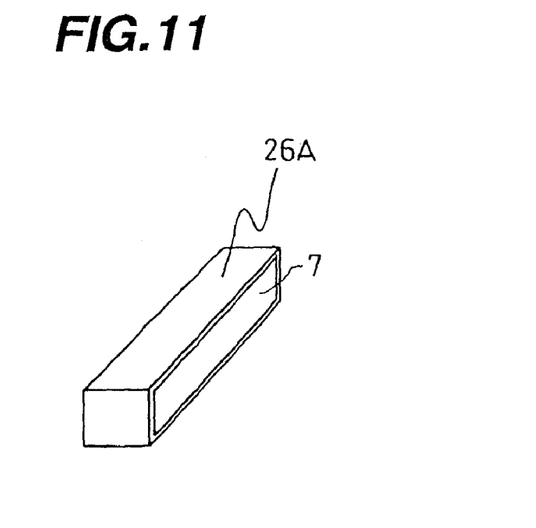
FIG. 11 is a perspective view showing an overall structure of the magnet cover shown in FIG. 10.

FIG. 10 is a sectional view corresponding to FIG. 5, showing the positional relationship between the claws $5Aa_1$, $5Ba_1$ of the claw-type magnetic poles 5A, 5B and the permanent magnet 7 provided in a modification of the above-described second embodiment of the vehicular alternator according to the present invention, in which a magnet cover is provided. FIG. 11 is a perspective view showing an overall structure of the magnet cover shown in FIG. 10. In FIG. 10, similar components to those in FIG. 5 are denoted by the same reference characters and a description thereof is omitted herein. In the following description, other drawings are also referred to, as an occasion requires. For the sake of brevity, FIG. 10 shows only one pole constituted by each of the claws $5Aa_1$, $5Ba_1$ as with FIG. 5.

As shown in FIGS. 10 and 11, a magnetic cover 26A has a frame-like shape surrounding the four surfaces of the permanent magnet 7 other than the magnetic pole surfaces thereof. Inner peripheral wall surfaces of the magnetic cover 26A are finished with such a high degree of accuracy as enabling those wall surfaces to come into a very close contact with the four surfaces of the permanent magnet 7 other than the magnetic pole surfaces thereof. Preferably, the magnetic cover 26A is also made of a nonmagnetic substance having superior rust resistance, e.g., stainless steel, so that the magnetic flux of the permanent magnet 7 disposed between the adjacent claws $5Aa_1$, $5Ba_1$ of the claw-type magnetic poles 5A, 5B acts effectively. In this modification, the magnetic cover 26A is likewise retained in place by the flanges 22. While the magnetic cover 26A is provided in this modification, both the magnetic pole surfaces of the permanent magnet 7 are entirely held in contact with the claws $5Aa_1$, $5Ba_1$ of the claw-type magnetic poles 5A, 5B (exactly speaking, the auxiliary magnetic pole plates 23).

With this modification, in addition to the similar advantages to those in the first embodiment, another advantage can also be obtained in preventing fragments of the broken permanent magnet 7 from ejecting outward of the rotor 1 due to the rotation of the rotor 1 in the event the permanent magnet 7 is broken for some reason.

When magnetizing the permanent magnet 7 in this modification, the permanent magnet 7 in a not yet magnetized state is first inserted in the magnetic cover 26A such that it closely contacts the inner peripheral wall surfaces of the magnetic cover 26A. Then, in that condition, the two auxiliary magnetic pole plates 23 are arranged to position on the magnetic pole surfaces of the permanent magnet 7. As seen from FIG. 10, each of the auxiliary magnetic pole plates 23 has substantially the same dimensions as a lateral surface of the magnetic cover 26A in the circumferential direction (left-and-right direction in FIG. 10) of the rotor 1. The auxiliary magnetic pole plates 23 are fixedly joined to the magnetic cover 26A by, e.g., welding to form a box, and the permanent magnet 7 is held in close contact with inner wall surfaces of the box.

After assembling the magnetic cover 26A, the two auxiliary magnetic pole plates 23, and the permanent magnet 7 into an integral unit as described above, the unit is disposed between the adjacent claws $5Aa_1$, $5Ba_1$ of the claw-type magnetic poles 5A, 5B such that the auxiliary magnetic pole plates 23 closely contact the claws $5Aa_1$, $5Ba_1$. The permanent magnet 7 is then magnetized through an external magnetizing yoke (not shown). As described above, the permanent magnet 7 is preferably magnetized in a final stage of the process for manufacturing the rotor 1. By employing such a magnetizing process, it is possible to prevent metal dust, such as iron powder, from adhering to the permanent magnet, and to realize a vehicular alternator with high reliability.

In the above three modifications, the magnetic covers 26, 26A each constitute a protective member set forth in claim 9.

As a matter of course, the magnetic covers 26, 26A may be optionally combined with any of the first to third embodiments described above.

Moreover, by providing a magnetic holding portion, which serves to mechanically hold the permanent magnet, on a part contacting the permanent magnet, such as the lateral surface of the claw in the circumferential direction of the rotor, the auxiliary magnetic pole portion and the auxiliary magnetic pole plate, the permanent magnet in a not yet magnetized state can be prevented from slipping off from the position between the claws of the claw-type magnetic poles, thus resulting in an improvement of the efficiency in works of, for example, assembling the rotor and magnetizing the permanent magnet.

Several modifications, in which a magnet holding portion is provided in the vehicular alternator of the present invention, will be described below one by one.

Figure 12:
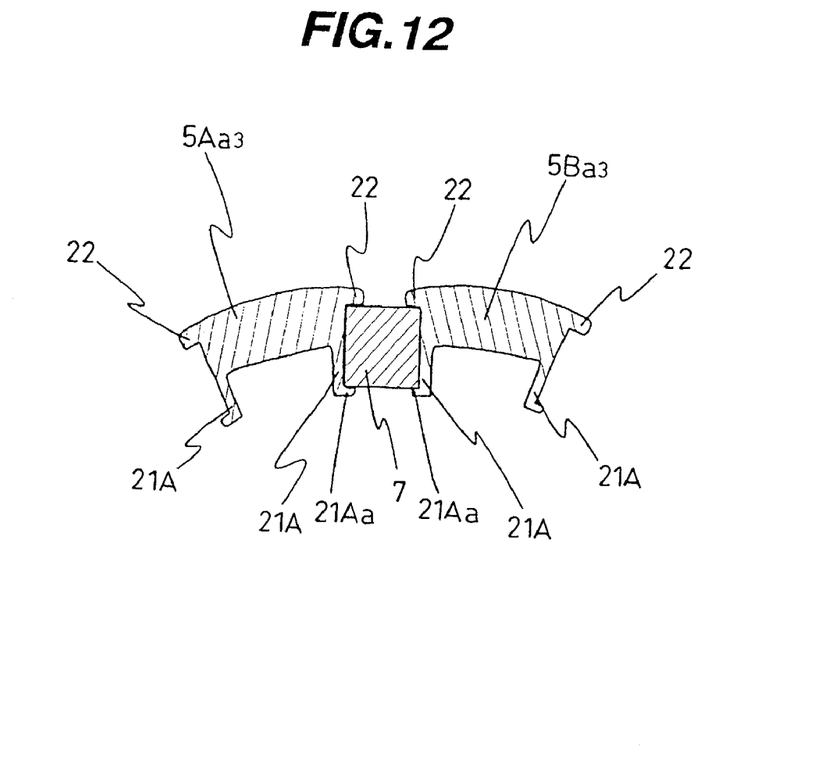
FIG. 12 is a sectional view corresponding to FIG. 3, showing the positional relationship between claws of claw-type magnetic poles and a permanent magnet provided in a modification of the first embodiment of the vehicular alternator according to the present invention, in which a magnet holding portion is provided.

FIG. 12 is a sectional view corresponding to FIG. 3, showing the positional relationship between claws $5Aa_3$, $5Ba_3$ of the claw-type magnetic poles 5A, 5B and the permanent magnet 7 provided in a modification of the above-described first embodiment of the vehicular alternator according to the present invention, in which a magnet holding portion is provided. In FIG. 12, similar components to those in FIG. 3 are denoted by the same reference characters and a description thereof is omitted herein. In the following description, other drawings are also referred to, as an occasion requires. For the sake of brevity, FIG. 12 shows only one pole constituted by each of the claws $5Aa_3$, $5Ba_3$ as with FIG. 3.

In this modification, as shown in FIG. 12, a magnet holding portion 21Aa is provided at an inner end (on the lower side in FIG. 12) of each of auxiliary magnetic pole portions 21A in the radial direction of the rotor 1 so as to grip the permanent magnet 7 between the magnet holding portion 21Aa and the flange 22. While the magnet holding portions 21Aa are provided in this modification, both the magnetic pole surfaces of the permanent magnet 7 are entirely held in contact with the claws $5Aa_3$, $5Ba_3$ of the claw-type magnetic poles 5A, 5B (exactly speaking, the auxiliary magnetic pole portions 21A). The remaining construction is the same as that of the first embodiment. It is needless to say that the magnet holding portion 21Aa is also applicable to the third embodiment.

Figure 13:
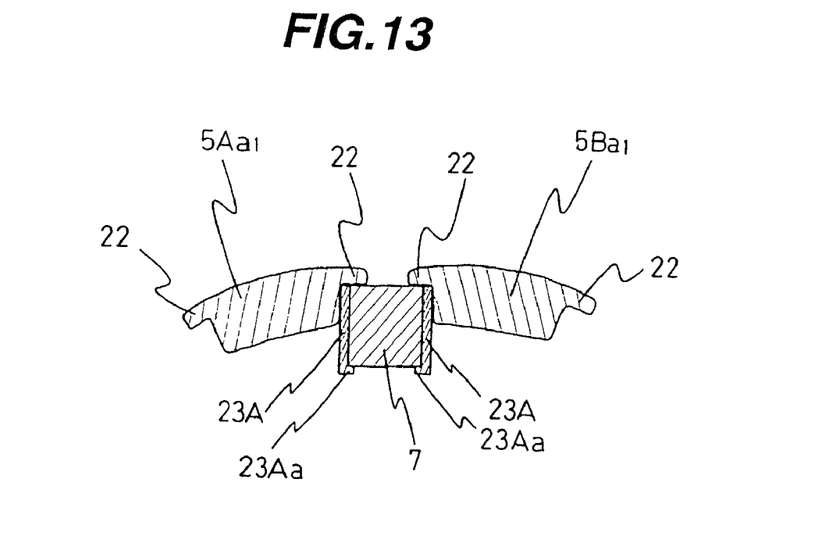
FIG. 13 is a sectional view corresponding to FIG. 5, showing the positional relationship between claws of claw-type magnetic poles and a permanent magnet provided in a modification of the second embodiment of the vehicular alternator according to the present invention, in which a magnet holding portion is provided.

FIG. 13 is a sectional view corresponding to FIG. 5, showing the positional relationship between the claws $5Aa_1$, $5Ba_1$ of the claw-type magnetic poles 5A, 5B and the permanent magnet 7 provided in a modification of the above-described second embodiment of the vehicular alternator according to the present invention, in which a magnet holding portion is provided. In FIG. 13, similar components to those in FIG. 5 are denoted by the same reference characters and a description thereof is omitted herein. In the following description, other drawings are also referred to, as an occasion requires. For the sake of brevity, FIG. 13 shows only one pole constituted by each of the claws $5Aa_1$, $5Ba_1$ as with FIG. 5.

In this modification, as shown in FIG. 13, a magnet holding portion 23Aa is provided at an inner end (on the lower side in FIG. 13) of each of auxiliary magnetic pole plates 23A in the radial direction of the rotor 1 so as to grip the permanent magnet 7 between the magnet holding portion 23Aa and the flange 22. While the magnet holding portions 23Aa are provided in this modification, both the magnetic pole surfaces of the permanent magnet 7 are entirely held in contact with the auxiliary magnetic pole plates 23A. The remaining construction is the same as that of the second embodiment.

Figure 14:
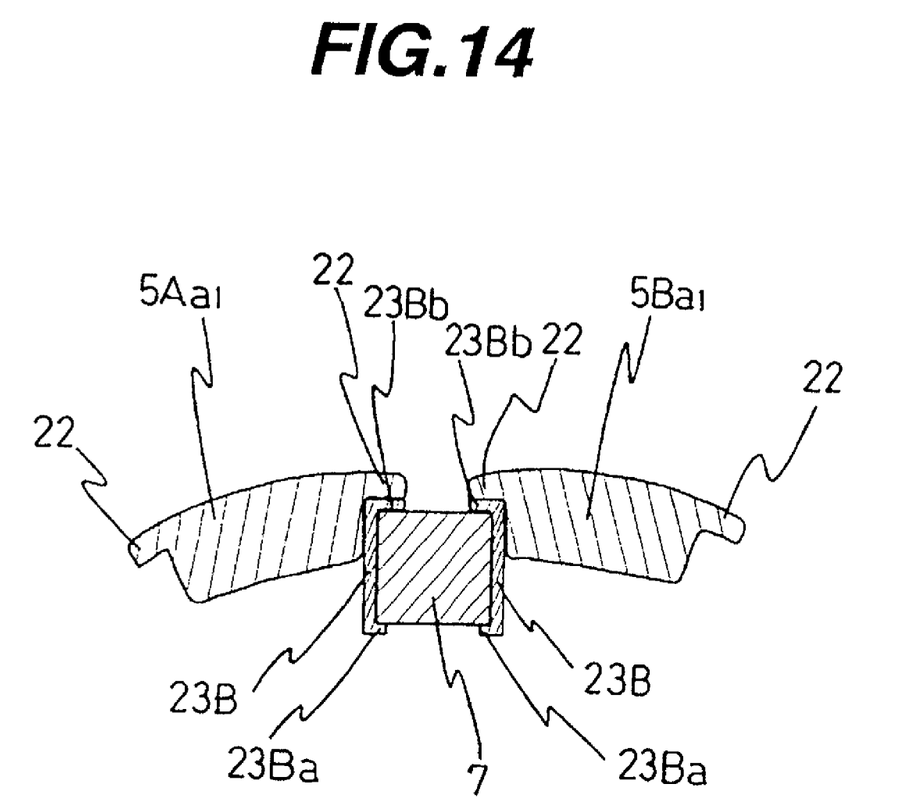
FIG. 14 is a sectional view corresponding to FIG. 5, showing the positional relationship between claws of claw-type magnetic poles and a permanent magnet provided in another modification of the second embodiment of the vehicular alternator according to the present invention, in which a magnet holding portion is provided.

FIG. 14 is a sectional view corresponding to FIG. 5, showing the positional relationship between the claws $5Aa_1$, $5Ba_1$ of the claw-type magnetic poles 5A, 5B and the permanent magnet 7 provided in another modification of the above-described second embodiment of the vehicular alternator according to the present invention, in which a magnet holding portion is provided. In FIG. 14, similar components to those in FIG. 5 are denoted by the same reference characters and a description thereof is omitted herein. In the following description, other drawings are also referred to, as an occasion requires. For the sake of brevity, FIG. 14 shows only one pole constituted by each of the claws $5Aa_1$, $5Ba_1$ as with FIG. 5.

In this modification, as shown in FIG. 14, magnet holding portions 23Ba, 23Bb are provided respectively at an inner end (on the lower side in FIG. 14) and outer end (on the upper side in FIG. 14) of each of auxiliary magnetic pole plates 23B in the radial direction of the rotor 1 so as to grip the permanent magnet 7 between them. While the magnet holding portions 23Ba, 23Bb are provided in this modification, both the magnetic pole surfaces of the permanent magnet 7 are entirely held in contact with the auxiliary magnetic pole plates 23B. The remaining construction is the same as that of the second embodiment.

When magnetizing the permanent magnet 7 in the two modifications described above with reference to FIGS. 13 and 14, the auxiliary magnetic pole plates 23A or 23B are previously bonded to the surfaces of the permanent magnet 7 (both the left and right lateral surfaces in FIGS. 13 and 14), which are to be magnetized. The permanent magnet 7 including the auxiliary magnetic pole plates is disposed between the adjacent claws $5Aa_1$, $5Ba_1$ of the claw-type magnetic poles 5A, 5B, and then magnetized through an external magnetizing yoke (not shown). As described above, the permanent magnet 7 is preferably magnetized in a final stage of the process for manufacturing the rotor 1. By employing such a magnetizing process, it is possible to prevent metal dust, such as iron powder, from adhering to the permanent magnet, and to realize a vehicular alternator with high reliability. In the modification shown in FIG. 14, particularly, the work efficiency is improved because the auxiliary magnetic pole plate 23B has substantially the same shape in a vertical section as viewed in FIG. 14. Thus, that shape of the auxiliary magnetic pole plate 23B eliminates the necessity of due care for checking which side is above when assembling the permanent magnet 7 including the auxiliary magnetic pole plates 23B, which have been bonded to the magnetized surfaces of the permanent magnet 7, between the adjacent claws 5Aa$_1$, 5Ba$_1$ of the claw-type magnetic poles 5A, 5B.

With the above three modifications, in addition to the similar advantages to those in the first embodiment, other advantages are obtained in that the permanent magnet 7 in a not yet magnetized state can be prevented from slipping off from the position between the claws of the claw-type magnetic poles 5A, 5B toward the side of the field windings 6, and the efficiency in works of, for example, assembling the rotor 1 and magnetizing the permanent magnet 7 can be improved.

In practice, because of machining allowances, surface roughness and other reasons, it is difficult to form the lateral surface of the claw in the circumferential direction of the rotor, the auxiliary magnetic pole portion, the auxiliary magnetic pole plate, etc. such that such a part is surely brought into contact with the whole of the magnetic pole surface of the permanent magnet. Looking from the microscopic point of view, there is a possibility that the lateral surface of the claw in the circumferential direction of the rotor, the auxiliary magnetic pole portion, the auxiliary magnetic pole plate, etc. are not perfectly in contact with (but just simply cover) the whole of the magnetic pole surface of the permanent magnet. From the practical point of view, however, such a case can also be regarded as in fact falling within the condition that the lateral surface of the claw in the circumferential direction of the rotor, the auxiliary magnetic pole portion, the auxiliary magnetic pole plate, etc. are substantially in contact with the whole of the magnetic pole surface of the permanent magnet. Therefore, similar advantages to those in the above embodiments can also be obtained.

Further, as a matter of course, the structure of the auxiliary magnetic pole portion 21' being effective to realize reinforcement of the strength and a smoother flow of the magnetic flux, and the structure of the flange 22' being effective to reduce noise, which have been described above with reference to FIG. 4, are also applicable to any of the above embodiments and the modifications thereof.

While the above embodiments have been described in connection with, by way of example, the vehicular alternator of the type that a current is supplied to the rotating field windings 6 through the brushes 13a, 13b, the present invention can also be applied to, e.g., a brushless vehicular alternator in which field windings are kept fixed. Thus, similar advantages to those in the above embodiments can be obtained when the present invention is applied to any type of vehicular alternator wherein a permanent magnet is disposed between adjacent claws of claw-type magnetic poles.

Also, while the flanges 22, 22' are provided in the above embodiments as a structure for preventing the permanent magnet 7 from ejecting outward of the rotor 1 due to the rotation of the rotor 1, the present invention is not limited to such a structure. For example, without needing the flanges 22, 22', a similar advantage can be obtained by employing a structure wherein each claw is formed to have a greater width in the circumferential direction of the rotor on the outer side than on the inner side in the radial direction of the rotor, and a trapezoidal permanent magnet is formed to have a greater width in the circumferential direction of the rotor on the inner side than on the outer side in the radial direction of the rotor, the permanent magnet being disposed between adjacent claws.

As described above, according to the first aspect of the present invention, since each claw of claw-type magnetic poles is formed to have a shape coming into contact with the whole of a magnetic pole surface of a permanent magnet, almost all of the magnetic flux outgoing from the permanent magnet is rendered to flow into the claw, whereby the resistance against a flow of the magnetic flux (i.e., magnetic loss) in the magnetic circuit formed by the permanent magnet can be reduced. It is therefore possible to effectively utilize the magnetic flux of the permanent magnet disposed between the adjacent claws of the claw-type magnetic poles, and to increase the output of the vehicular alternator.

Also, according to the second aspect of the present invention, since an auxiliary magnetic pole plate contacting the whole of the magnetic pole surface of the permanent magnet is interposed between each claw and the permanent magnet, almost all of the magnetic flux outgoing from the permanent magnet is rendered to flow into the claw-type magnetic poles through the auxiliary magnetic pole plates, whereby the resistance against a flow of the magnetic flux (i.e., magnetic loss) in the magnetic circuit formed by the permanent magnet can be reduced. It is therefore possible to effectively utilize the magnetic flux of the permanent magnet disposed between the adjacent claws of the claw-type magnetic poles, and to increase the output of the vehicular alternator.

What is claimed is:

1. A vehicular alternator comprising a rotor and a stator constituted by coiling stator windings over a stator core, wherein:

said rotor comprises i) a pair of claw-type magnetic poles which are arranged in an opposed relation, and each of which has a plurality of claws that are cantilevered at a proximal end thereof and extend axially to a distal end opposite said proximal end, ii) permanent magnets having rectangular lateral surfaces which face in a circumferential direction of the rotor and form magnetic pole surfaces that are disposed between and in contact with opposing lateral surfaces of adjacent claws of said pair of claw-type magnetic poles, and iii) field windings coiled radially inward of said plurality of claws;

the opposing lateral surfaces of said claws adjacent said permanent magnets are formed into substantially the same rectangular shape as the magnetic pole surfaces with which they are in contact, such that said lateral surfaces of said claws are in contact with the whole of the rectangular lateral magnetic pole surfaces of said permanent magnets; and each of said claws has, in a circumferentially central portion thereof, a radial thickness that is tapered along an axial direction, being thicker at said proximal end than at said distal end thereof.

2. A vehicular alternator according to claim 1, wherein said lateral surfaces of said claws are formed by circumferentially laterally disposed auxiliary magnetic pole portions which contact the whole of the magnetic pole surfaces of said permanent magnets, and which project radially inwardly from said circumferentially central portion of said claws.

3. A vehicular alternator according to claim 2, wherein said auxiliary magnetic pole portion is formed to have a greater thickness at a radially outer portion than at a radially inner portion thereof.

4. A vehicular alternator according to claim 1, wherein said plurality of claws are interconnected by a substantially ring-shaped coupling member.

5. A vehicle alternator according to claim 1, wherein each of said plurality of claws has a magnet holding portion for holding said permanent magnet.

6. A vehicular alternator according to claim 1, wherein a protective member is disposed at least on an outer side of said permanent magnet in the radial direction of said rotor.

7. A vehicular alternator having a stator including a stator core and stator windings coiled over the stator core, and a rotor provided to rotate in a circumferential direction relative to the stator, with gaps separating said rotor and stator, wherein said rotor comprises:
  a pair of claw-type magnetic poles arranged in an opposed relation, each of said claw-type magnetic poles having a plurality of claws;
  field windings coiled with the claw-type magnetic poles; and
  a plurality of permanent magnets provided to said claw-type magnetic poles; wherein,
  claws of one of the pair of the claw-type magnetic poles and claws of the other of the pair of the claw-type magnetic poles are disposed alternately in said circumferential direction of said rotor;
  each of the claws has a proximal end portion at which said claw is cantilevered, a distal end portion having a radial thickness that is thinner than the proximal end portion, and lateral portions which face in substantially opposed directions circumferentially of said rotor;
  said permanent magnets are interposed between claws which are circumferentially adjacent to each other;
  each of said permanent magnets interposed between said circumferentially adjacent claws has magnetic pole surfaces which face in opposed directions circumferentially of said rotor and has a radial thickness that is greater than the radial thickness of the distal end portion of said claws;
  said permanent magnets are interposed between said circumferentially adjacent claws such that a first portion of each of the magnetic pole surfaces faces a corresponding one of the lateral portions of the claws while a remaining portion of each magnetic pole surface does not face said corresponding one of the lateral portions of the claws;
  auxiliary magnetic pole portions are provided between said claws and said permanent magnets; and
  each of said auxiliary magnetic pole portions is in contact with substantially a whole area of the magnetic pole surfaces of circumferentially adjacent permanent magnets, including said remaining portion, for enabling magnetic flux outgoing from said remaining portion to flow into the claws.

8. A vehicular alternator according to claim 7, wherein:
  each of said auxiliary magnetic pole portions is formed as a single piece with one of said claws, and covers said magnetic pole surface with said lateral portion of the claw; and
  the auxiliary magnetic pole portions are in contact with the magnetic pole surface.

9. The vehicular alternator according to claim 7, wherein said auxiliary magnetic pole portions comprises members interposed between said magnetic pole surfaces and said claw lateral portion, for holding said permanent magnet.

* * * * *